US012778100B2

(12) United States Patent
Yasuda et al.

(10) Patent No.: US 12,778,100 B2
(45) Date of Patent: Nov. 3, 2026

(54) FISHING TOOL

(71) Applicant: GLOBERIDE, Inc., Tokyo (JP)

(72) Inventors: Hiromu Yasuda, Tokyo (JP); Motohiro Nonogaki, Tokyo (JP); Kazumasa Ishihara, Tokyo (JP); Yuichi Umezawa, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 455 days.

(21) Appl. No.: 18/241,076

(22) Filed: Aug. 31, 2023

(65) Prior Publication Data

US 2024/0081310 A1 Mar. 14, 2024

(30) Foreign Application Priority Data

Sep. 13, 2022 (JP) ................................ 2022-145134

(51) Int. Cl.
*A01K 89/01* (2006.01)
*A01K 89/02* (2006.01)

(52) U.S. Cl.
CPC .................................... *A01K 89/02* (2013.01)

(58) Field of Classification Search
CPC .... A01K 89/02; A01K 89/015; A01K 89/033; A01K 89/05
See application file for complete search history.

(56) References Cited

U.S. PATENT DOCUMENTS 11,696,575 B2 7/2023 Yasuda
2005/0162976 A1* 7/2005 Kuriyama .............. A01K 89/00 367/111
2007/0108330 A1 5/2007 Ikuta et al.
2022/0061283 A1 3/2022 Yasuda
2023/0301287 A1 9/2023 Yasuda

FOREIGN PATENT DOCUMENTS

CN 1466874 A 1/2004
CN 101496509 A * 8/2009
CN 110012880 A * 7/2019 ........... A01K 89/015
CN 111226880 A * 6/2020 ....... A01K 89/01556
(Continued)

OTHER PUBLICATIONS

Jul. 29, 2025 Notice of Preliminary Rejection in Korean Patent Application No. 10-2023-0115982.
(Continued)

*Primary Examiner* — Emmanuel M Marcelo
(74) *Attorney, Agent, or Firm* — Oliff PLC

(57) ABSTRACT

A fishing tool according to an embodiment of the present disclosure comprises an operating part that is operable by a user to change a setting related to a characteristic of the fishing tool, and a control part that controls the characteristic of the fishing tool, and is capable of receiving an operation by the operating part and changing the setting related to the characteristic of the fishing tool. The change in the setting related to the characteristic of the fishing tool is performed using a plurality of setting values for the setting, and based on whether a previous change in the setting related to the characteristic of the fishing tool is a change in the setting in a first direction or a change in the setting in a second direction, the control part receives a next operation of the operating part and changes a setting value of the setting.

17 Claims, 6 Drawing Sheets

(56) References Cited

FOREIGN PATENT DOCUMENTS

| | | | | | |
|---|---|---|---|---|---|
| CN | 110740964 B | * | 6/2021 | ............. | B66D 1/505 |
| CN | 113678799 A | * | 11/2021 | ........... | A01K 89/012 |
| CN | 114051985 A | | 2/2022 | | |
| CN | 114097733 A | * | 3/2022 | ........... | A01K 89/033 |
| JP | H01312949 A | | 12/1989 | | |
| JP | 2007135417 A | | 6/2007 | | |
| JP | 2015047074 A | * | 3/2015 | ........... | A01K 89/017 |
| JP | 2016021875 A | | 2/2016 | | |
| JP | 2016129501 A | | 7/2016 | | |
| JP | 2016136929 A | * | 8/2016 | ........... | A01K 89/015 |
| JP | 2022026103 A | | 2/2022 | | |
| JP | 7040922 B2 | | 3/2022 | | |
| JP | 202238636 A | | 3/2022 | | |
| KR | 20050054443 A | * | 6/2005 | ......... | A01K 89/0192 |
| KR | 20120000521 A | * | 1/2012 | ........... | A01K 89/015 |
| KR | 101527818 B1 | * | 6/2015 | | |
| KR | 20220153504 A | * | 11/2022 | ........... | G06F 3/0482 |

OTHER PUBLICATIONS

Aug. 26, 2025 Office Action issued in Japanese Patent Application No. 2022-145134.

Feb. 19, 2024 Office Action issued in Taiwanese Patent Application No. 112126318.

Jun. 17, 2025 Office Action issued in Japanese Patent Application No. 2022-145134.

Dec. 11, 2025 Office Action issued in Chinese Patent Application No. 202311114598.2.

Jun. 13, 2026 Office Action issued in Chinese Patent Application No. 202311114598.2.

* cited by examiner

| NUMBER OF OPERATIONS | SETTING VALUE | SETTING MOVEMENT DIRECTION |
|---|---|---|
| INITIAL | 8 | − |
| 1 | 7 | − |
| 2 | 6 | − |
| ··· | ··· | − |
| 6 | 2 | − |
| 7 | 1 | + |
| 8 | 2 | + |
| ··· | ··· | + |
| 13 | 7 | + |
| 14 | 8 | − |
| 15 | 7 | − |
| ··· | ··· | |

FIG. 5

FISHING TOOL

CROSS-REFERENCE TO RELATED APPLICATION

This application claims priority under 35 U.S.C. § 119 to Japanese Patent Application No. 2022-145134 filed on Sep. 13, 2022 in the Japanese Patent Office, the entire contents of each hereby incorporated by reference.

FIELD

The present disclosure relates to a fishing tool (for example, a fishing reel or the like), and more particularly to a fishing tool capable of changing a setting of a characteristic of the fishing tool by a button operation.

BACKGROUND

Conventionally, there has been known a fishing reel in which a user can change a setting of an optimum value of a braking force that can vary depending on various factors such as an environmental change such as a wind direction, a balance of a weight of a lure to be used, air resistance, and the like, a length and hardness of a rod to be used, and user's skill from among a plurality of setting values according to a situation.

SUMMARY

A spool braking device for a double bearing reel disclosed in JP 2007-135417 A is a spool braking device for a double bearing reel that is used for casting, rotatably mounted on a reel body, and brakes a spool around which a fishing line is wound. The spool braking device includes a spool braking means that is provided on the spool and the reel body and electrically controllably brakes the spool, a first operating tool that is movably provided on the reel body and can be operated to a plurality of first operation positions, a second operating tool that is movably provided on the reel body and can be operated to a plurality of second operation positions, and a spool control means that electrically controls a braking force of the spool braking means in accordance with the first operation position of the first operating tool and the second operation position of the second operating tool.

However, in JP 2007-135417 A, the setting is changed by one or more dials, and when such a dial is used as compared with a button, it is possible to perform the operation of left and right rotations by one operating member, but there is a problem that it is difficult to perform waterproofing due to its nature, and it is difficult to perform downsizing because several operating members to be set are required.

The present disclosure has been made in view of the above circumstances, and an object thereof is to provide a fishing tool that can not only easily and reliably change a setting of a characteristic of the fishing tool with one operating member, but also can change settings of a plurality of characteristics of the fishing tool, thereby enabling downsizing and waterproofing of the entire device. Other objects of the present disclosure will be clarified by referring to the overall description disclosed herein.

A fishing tool according to an embodiment of the present disclosure comprises: an operating part that is operable by a user to change a setting related to a characteristic of the fishing tool; and a control part that controls the characteristic of the fishing tool, the control part being capable of receiving an operation by the operating part and changing the setting related to the characteristic of the fishing tool. The change in the setting related to the characteristic of the fishing tool is performed using a plurality of setting values for the setting. Based on whether a previous change in the setting related to the characteristic of the fishing tool is a change in the setting in a first direction or a change in the setting in a second direction, the control part receives a next operation of the operating part and changes a setting value of the setting.

In the fishing tool according to the embodiment of the present disclosure, the first direction is a direction in which the setting value of the setting related to the characteristic of the fishing tool increases, and the second direction is a direction in which the setting value of the setting related to the characteristic of the fishing tool decreases.

In the fishing tool according to the embodiment of the present disclosure, when the first direction is a direction in which the setting value of the setting related to the characteristic of the fishing tool increases, the control part receives the next operation of the operating part and changes the setting value of the setting in the increase direction, and when the second direction is a direction in which the setting value of the setting related to the characteristic of the fishing tool decreases, the control part receives the next operation of the operating part and changes the setting value of the setting in the decrease direction.

In the fishing tool according to the embodiment of the present disclosure, the characteristic of the fishing tool is any one of a braking force of a cast brake, a drag force of a drag device, output of a notification part to the user, and a winding force of a winding device.

In the fishing tool according to the embodiment of the present disclosure, when the previous change in the setting related to the characteristic of the fishing tool is a change in the setting in the first direction or a change in the setting in the second direction, and the setting value of the setting reaches an upper limit or a lower limit, the control part receives the next operation of the operating part and changes the setting in a direction opposite to the first direction or a direction opposite to the second direction.

The fishing tool according to the embodiment of the present disclosure comprises a state change detection part that detects a state change of the fishing reel. In a case where the state change detection part detects the state change of the fishing reel, the control part receives the next operation of the operating part, and performs a change in a direction opposite to the first direction when the previous change in the setting is a change in the first direction and performs a change in a direction opposite to the second direction when the previous change in the setting is a change in the second direction.

In the fishing tool according to the embodiment of the present disclosure, the state change detection part is a clutch detection part or a motion sensor.

The fishing tool according to the embodiment of the present disclosure comprises a setting change direction initialization part. When initialization is detected by the setting change direction initialization part, the control part receives the next operation of the operating part and does not perform a change in the setting value of the setting based on the previous change of the setting related to the characteristic of the fishing tool.

In the fishing tool according to the embodiment of the present disclosure, the setting change direction initialization part detects at least one of a cast end, a cast preparation start, or a system start.

In the fishing tool according to the embodiment of the present disclosure, in in a case where the characteristic of the fishing tool is a braking force of a cast brake, when the initialization is detected by the setting change direction initialization part, the control part receives the next operation of the operating part and changes the setting value in a direction in which the braking force decreases.

In the fishing tool according to the embodiment of the present disclosure, the operating part is a push button. In the fishing tool according to the embodiment of the present disclosure, when the operating part is a push button, a change in setting of a different characteristic of the fishing tool is performed by long pressing of the push button.

The fishing tool according to the embodiment of the present disclosure comprises a notification part to the user. A notification method to the user is changed according to a change direction of the setting value of the setting.

According to the above embodiment, it is possible to provide a fishing tool that can not only easily and reliably change a setting of a characteristic of the fishing tool with one operating member, but also can change settings of a plurality of characteristics of the fishing tool, thereby enabling downsizing and waterproofing of the entire device.

BRIEF DESCRIPTION OF THE DRAWINGS

FIG. 5 is a diagram illustrating a setting change of the fishing reel which is the fishing tool according to the embodiment of the present disclosure.

DETAILED DESCRIPTION

Hereinafter, embodiments of a fishing tool according to the present disclosure will be specifically described with reference to the accompanying drawings while a fishing reel is taken as an example. However, the fishing tool according to the present disclosure is not necessarily limited to the fishing reel, and includes a fishing rod, an electric float, a fish finder, a remote controller for adjusting characteristics thereof, a mobile phone, a wearable terminal such as a smart watch, and the like and is not limited to a specific device. Components common in a plurality of drawings are assigned with the same reference signs throughout the plurality of drawings. It should be noted that each of the drawings is not always illustrated in a precise aspect ratio for the convenience of description.

Figure 1:
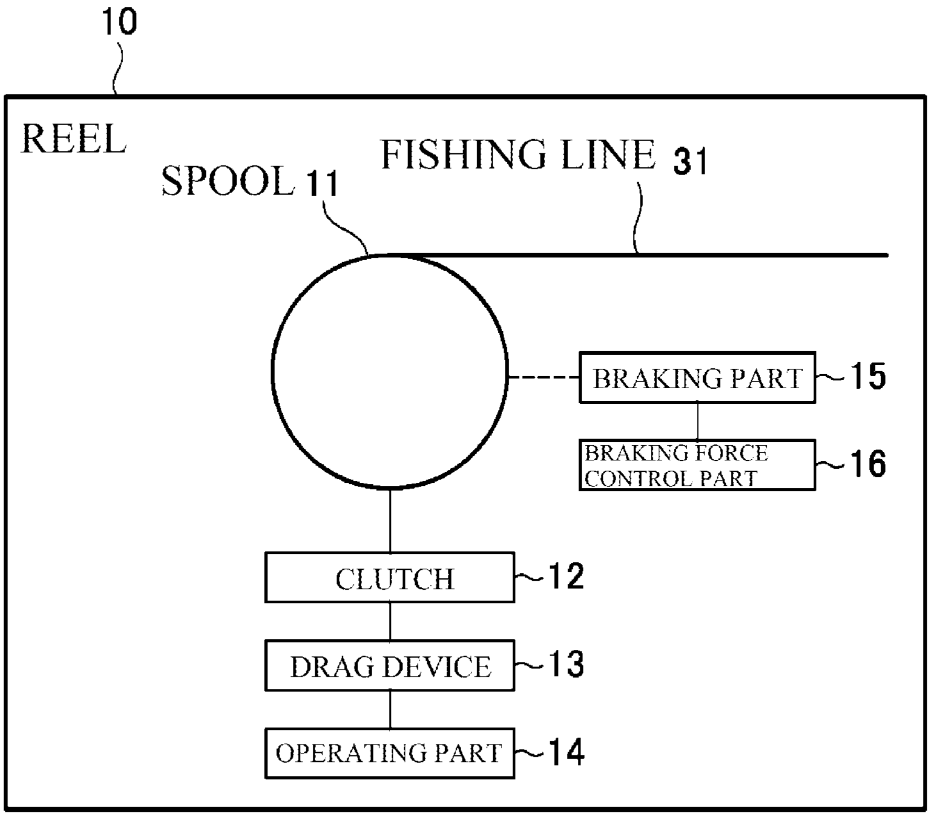
FIG. 1 is a diagram illustrating a basic configuration of a fishing reel which is a fishing tool according to an embodiment of the present disclosure.

First, a basic configuration of a fishing reel 10 of a fishing tool according to an embodiment of the present disclosure will be described with reference to FIG. 1. As illustrated in the drawing, the fishing reel 10 winds a fishing line 31 around a spool 11, and switches between a state in which the fishing line 31 can be released from the spool 11 and a state in which the fishing line 31 cannot be released. When a tension equal to or more than a setting value is applied to the fishing line 31, the spool 11 idles (drag function), and a threshold tension is set, so that a braking force for preventing backlash during casting can be adjusted.

The spool 11 can wind the fishing line 31, and when the spool 11 is forward rotated by an operating part (handle) 14, the spool 11 can wind the fishing line 31. A clutch 12 can select connection and disconnection of power transmission with the operating part (handle) 14. In a connection state, winding is possible by the operating part (handle) 14. In a disconnection state, the spool 11 can be freely rotated in forward and backward directions, and the fishing line 31 can be released. In addition, a drag device 13 can idle the spool 11 when a load equal to or more than the tension set for the fishing line 31 is applied. In addition, a known oscillator device that evenly winds the fishing line 31 around the spool 11 by reciprocating a line guide that guides the fishing line in conjunction with the rotation of the spool 11 may be provided.

The operating part (handle) 14 transmits a user's rotational operation to the spool 11 by a transmission mechanism such as a gear, and can rotate the spool 11 forward. Note that the operating part (handle) 14 may be a combination of an operating member such as a lever and a power source such as a motor. Further, a braking part (spool braking part) 15 can generate a braking force on the spool. As a result, it is possible to suppress occurrence of backlash during casting. The braking force can be set by a braking force control part (spool braking force control part) 16.

Figure 2:
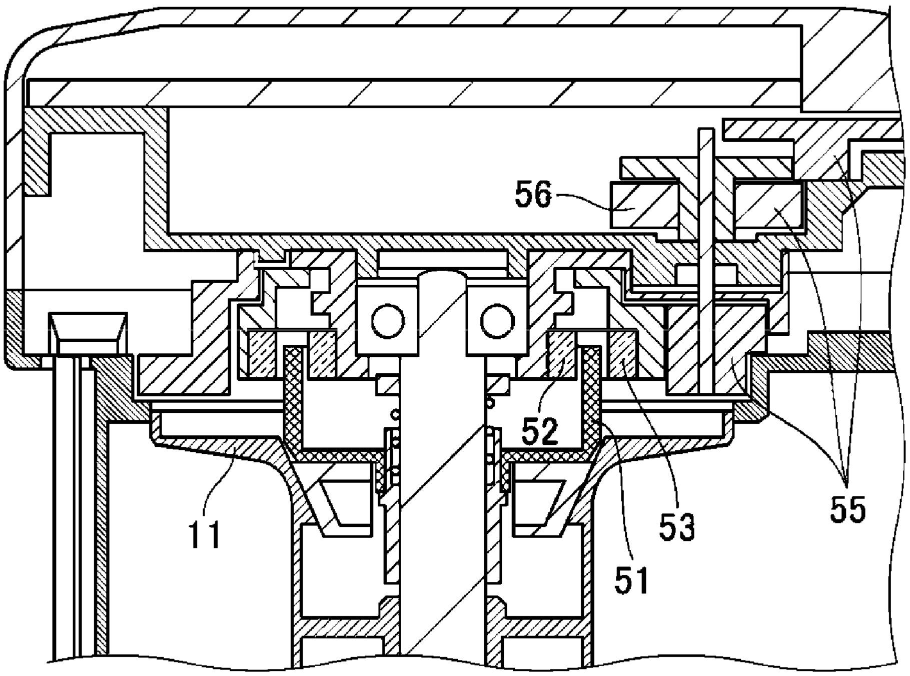
FIG. 2 is a diagram illustrating a braking part or a braking device of the fishing reel which is the fishing tool according to the embodiment of the present disclosure.

Next, the braking part (spool braking part) 15 will be described using FIG. 2. The braking part (spool braking part) 15 comprises a stationary magnet 52 and a rotating magnet 53 which are disposed to face each other with a minute gap in a radial direction of an eddy current generation plate 51 formed of an annular rotating body made of a nonmagnetic conductor integrally attached to the spool 11 and in which N poles and S poles are alternately magnetized in a circumferential direction in an annular shape, and detects rotation positions of a motor and a magnet that rotate the rotating magnet 53. The braking part (spool braking part) 15 is configured to comprise the stationary magnet 52 that is disposed to face the eddy current generation plate 51, the rotating magnet 53 that sandwiches the eddy current generation plate 51 from the opposite side of the stationary magnet 52, a motor (not illustrated in the drawings) that rotationally moves the rotating magnet 53, a gear train 55 that decelerates driving of the motor and transmits the decelerated driving of the motor to the rotating magnet 53, and a magnet position sensor 56 in which a magnet position sensor that detects a position of the rotating magnet 53 is disposed.

An outer circumferential portion of the stationary magnet 52 is divided into 6 portions that are magnetized with alternate N poles and S poles. An inner circumferential portion of the rotating magnet 53 is divided into 6 portions that are magnetized with alternate N poles and S poles. The magnetic field generated by the stationary magnet 52 and the rotating magnet 53 penetrates the eddy current generation plate 51 located therebetween. Therefore, when the spool 11 rotates, an eddy current is generated in the eddy current generation plate 51, and a braking force according to a rotational speed acts.

By rotating the rotating magnet 53 by the motor and the gear train 55, the magnetic field acting on the eddy current generation plate 51 can be changed. As a result, the braking force can be set to a predetermined amount. That is, when the rotating magnet 53 and the stationary magnet 52 are disposed to face each other at the same poles, the magnetic field applied to the eddy current generation plate 51 becomes weak, and the braking force becomes weak. When the rotating magnet 53 and the stationary magnet 52 are disposed to face each other at different poles, the magnetic field applied to the eddy current generation plate 51 becomes strong, and the braking force becomes strong. The magnet position sensor 56 is a sensor that detects the position of the rotating magnet 53, and comprises a known position sensor such as a magnetic sensor or an electric resistance sensor.

The braking force control part (spool braking force control part) 16 performs feedback control of the motor by causing a necessary current to flow to the motor while checking the value of the magnet position sensor 56. As a result, a predetermined braking force can be applied to the spool 11. As such, the braking force applied to the spool 11 can be changed temporally by the braking force control part (spool braking force control part) 16.

Note that the eddy current generation plate 51 can be configured by a part of the spool 11. In addition, the eddy current generation plate 51 may change the magnetic field by relatively moving with respect to the spool 11 by the action of the centrifugal force according to the rotational speed of the spool 11 as known, and may have a predetermined braking force characteristic.

In addition, the above-described braking part (spool braking part) 15 is not limited to the type of using the eddy current described above, and a similar effect can be realized as long as the braking force can be temporally adjusted by a microcomputer. As another type of the braking device, there are a type of generating a regenerative brake between a permanent magnet attached to the spool and a coil provided in a reel body, a type of using a contact brake changing a contact force with a friction plate attached to the spool by an electromagnetic actuator or the like, and the like, and the type is not limited to a specific type.

Figure 3:
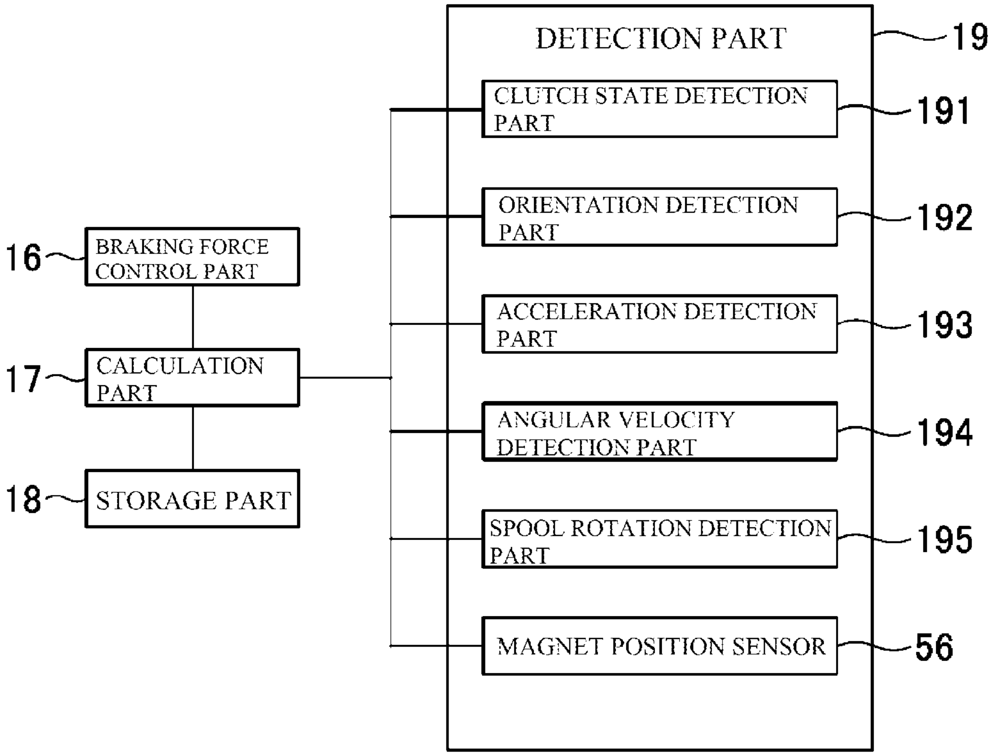
FIG. 3 is a diagram illustrating a detection part of the fishing reel which is the fishing tool according to the embodiment of the present disclosure.

Next, FIG. 3 is a diagram illustrating an electrical configuration of the fishing reel 10. The fishing reel 10 comprises a detection part (sensor) 19 that detects various operations by a user and a state of the reel. A detection result is sent to a calculation part 17, and is subjected to calculation processing as necessary or temporarily stored in a storage part 18, and then a target braking force is given to the braking force control part 16. The detection part 19 comprises the following. A part thereof may be omitted due to limitations such as costs and sizes.

A clutch state detection part 191 detects whether or not the fishing line 31 can be released from the reel 10. This can be realized by detecting the connection state of the clutch 12. A limit sensor or the like may be attached to a part of a member in which the clutch operates.

Next, an orientation detection part 192 can detect the orientation of the reel 10 by detecting a geomagnetic direction. An acceleration detection part 193 detects acceleration in a translation direction of the reel 10. This can be realized by using a conventionally known acceleration sensor such as a piezoresistive type or a capacitance detection type. Further, an angular velocity detection part 194 detects an angular velocity (speed in the rotation direction) of the reel 10. This can be realized by using a conventionally known gyro sensor such as a type of detecting a frequency change of a vibrated piezoelectric element.

Note that the orientation detection part 192, the acceleration detection part 193, and the angular velocity detection part 194 can be achieved by using a sensor called a 9-axis motion sensor that detects the orientation, the acceleration, and the angular velocity of each of three orthogonal axes. Hereinafter, this is referred to as a motion sensor. By calculating these detection results, the posture of the fishing rod to which the reel 10 has been attached and the operation by the user can be acquired.

For example, the direction of the fishing rod with respect to gravity can be acquired by detecting the acceleration of each of the three orthogonal axes by the acceleration detection part 193 in a state where the fishing rod is stationary. In addition, an output value of each sensor may include an error. Therefore, a more accurate value can be obtained by estimating the position and posture of the reel in a reliable manner using a known calculation method such as a Kalman filter from a plurality of output values of the motion sensor. Note that the motion sensor may be disposed on the fishing rod.

Figure 4:
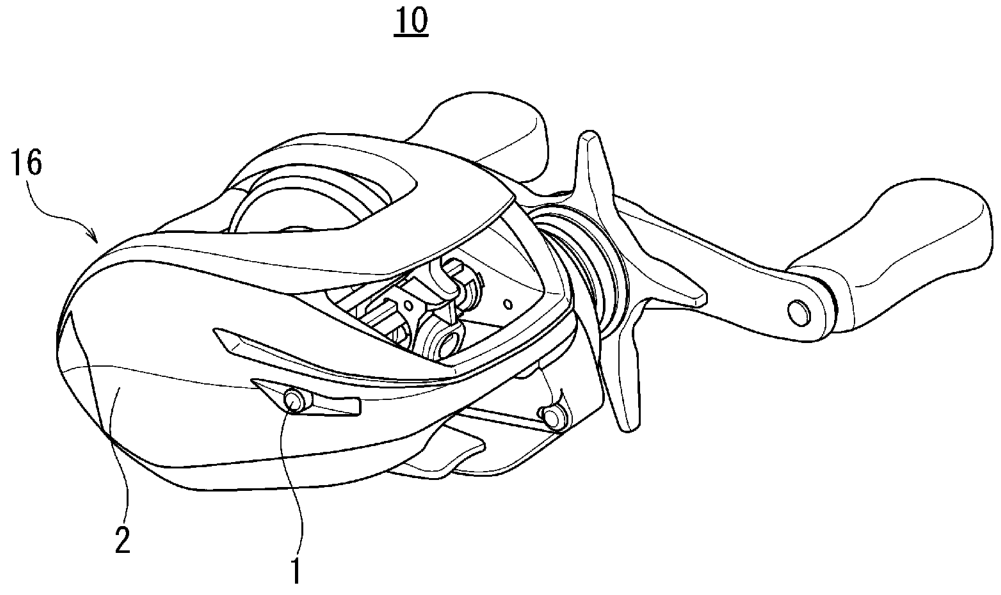
FIG. 4 is a diagram illustrating the fishing reel which is the fishing tool according to the embodiment of the present disclosure.

Next, details of the fishing reel 10 of the fishing tool according to the embodiment of the present disclosure will be described with reference to FIG. 4. As illustrated in the drawing, the fishing reel 10 of the fishing tool according to the embodiment of the present disclosure comprises an operating part 1 (the basic configuration of the fishing reel 10 is as described above and will not be described again). Various modes are considered for the operating part 1, but in the present specification, an operating button will be described as an example. In a side plate 2, a palm-side portion where a hand is placed when the fishing reel 10 is held is required to have a constant area, and a predetermined surface area is required to ensure operability of the operating button 1 and realize a waterproof structure. Since increasing the number of operating buttons 1 leads to an increase in size of the entire device, the number of operating buttons is one in the present embodiment.

As a characteristic of the fishing reel 10 which is the fishing tool according to the embodiment of the present disclosure, a braking force of a cast brake can be considered. The optimum braking force may change from moment to moment depending on a natural environment such as the direction and strength of the wind, a length of the rod, a weight of the lure or the fishing line to be thrown, a change of use conditions such as air resistance, a skill of the user, and the like. In order to cope with these changes, it is necessary to appropriately adjust the setting (setting value) of the braking force of the braking device by a user operation.

The spool braking force control part (control part) 16 in the fishing reel 10 of the fishing tool according to the embodiment of the present disclosure can select the characteristic (braking force) of the braking device from a plurality of setting lists. That is, as an example, as illustrated in FIG. 5, one setting can be selected from eight candidates for the braking force, and in the present embodiment, a setting 1, a setting 2, . . . , and a setting 8 are given in order of weak braking force. Although details will be described later, the user can select a necessary setting from the setting lists by operating the operating button 1. Here, the control part may be provided separately from the spool braking force control part 16, or may be incorporated in another control part. In the present specification, for convenience of description, it is assumed that the control part in the fishing reel 10 of the fishing tool according to the embodiment of the present disclosure is the spool braking force control part 16, but it is not intended to be limiting in any way.

More specifically, it is assumed that the setting 8 is given in an initial state, and an initial movement direction is a direction in which the setting value is decreased. Here, in the present specification, a first direction is a direction in which the setting value is increased and a second direction is a direction in which the setting value is decreased, and these directions are collectively referred to as setting (value) movement directions. Brake adjustment (braking force adjustment) at the time of casting (throwing) is normally configured to decrease the brake (braking) from a strong side (high setting value) to a weak side (low setting value) in order to avoid occurrence of backlash.

Next, the number of operations of the operating button 1, the setting at that time, and the setting movement direction will be described with reference to FIG. 5 again. In a first click (pressing) operation of the operating button 1, since the setting movement direction is the direction (second direction) in which the setting value is decreased, the setting 7 is given. When the click (pressing) operation of the operating button 1 is further continued, the settings are decreased in order of the settings 6, 5, and 4 as illustrated in the drawing. In a seventh operation of the operating button 1, the setting 1 which is the lower end of the list is given, and the setting movement direction is reversed to become a + (plus) direction, that is, the direction (first direction) in which the setting value is increased.

After that, by an eighth operation of the operating button 1, the setting 2 is given. When the click (pressing) operation is continued again, the settings are increased in order of the settings 3 and 4. When the click (pressing) operation is further continued and the setting 8 which is the upper end of the list is given by a fourteenth operation, the setting movement direction is reversed again to become a – (minus) direction, that is, the direction (second direction) in which the setting value is decreased. When the click (pressing) operation is continued again, the settings are decreased in order of the settings 7, 6, and 5. As described above, a setting movement method is adopted in which the setting movement direction is reversed at both ends of the setting lists, that is, the setting movement direction is rebounded at both ends each time an operation is performed.

By changing the braking force as described above, the setting can be changed with a relatively small number of operations even if the number of operating parts is one. For comparison, a case where the setting movement direction is fixed will be considered. In this case, when a click (pressing) operation is performed once, the setting is always changed to the decrease direction, and when the click is performed again at the lower end of the setting lists, the setting is changed to return to the upper end of the setting lists. That is, the following is obtained.

(8→7→6→ . . . 2→1→8→7 . . . )

In this case, when the user desires to increase the setting by one, the user needs to perform operations by (the number −1) of the setting lists. That is, as in the example illustrated in FIG. 5, in a case where there are eight options, it can be seen that seven click (pressing) operations are required, which is very complicated. That is, as described above, it can be seen that a large number of click (pressing) operations are required for one setting change. On the other hand, in the embodiment of the present disclosure, as described below, when it is desired to change each setting, the following number of click (pressing) operations are required.

Setting 1→Setting 2: once
Setting 2→Setting 3: 3 times (2→1→2→3)
Setting 3→Setting 4: 5 times (3→2→1→2→3→4)
Setting 4→Setting 5: 7 times (4→3→2→1→2→3→4→5)
Setting 5→Setting 6: 9 times (5→4→3→2→1→2→3→4→5→6)
Setting 6→Setting 7: 11 times (omitted)
Setting 7→Setting 8: 13 times (omitted)

According to the fishing tool (fishing reel 10) according to the embodiment of the present disclosure, it is possible to increase the setting by one with a smaller number of operations depending on the setting location. Since there are practically few cases where a change from a minimum value to a maximum value of a setting is required or a change from a minimum value to a maximum value of a setting is required as a setting change of the braking device of the fishing reel, it can be said that it is not efficient to assign an inefficient operation method for such a change. Therefore, as in the fishing tool (fishing reel 10) according to the embodiment of the present disclosure, it can be seen that, by enabling either 1 up or 1 down when the operating part (operating button) is pressed and reversing the setting movement direction at both ends (that is, the upper limit and the lower limit), the probability that the user can select the predetermined setting value with a smaller number of operations is increased.

A fishing tool according to an embodiment of the present disclosure comprises: an operating part that is operable by a user to change a setting related to a characteristic of the fishing tool; and a control part that controls the characteristic of the fishing tool, the control part being capable of receiving an operation by the operating part and changing the setting related to the characteristic of the fishing tool. The change in the setting related to the characteristic of the fishing tool is performed using a plurality of setting values for the setting. Based on whether a previous change in the setting related to the characteristic of the fishing tool is a change in the setting in a first direction or a change in the setting in a second direction, the control part receives a next operation of the operating part and changes a setting value of the setting. In the fishing tool according to the embodiment of the present disclosure, the first direction is a direction in which the setting value of the setting related to the characteristic of the fishing tool increases, and the second direction is a direction in which the setting value of the setting related to the characteristic of the fishing tool decreases.

According to the fishing tool according to the embodiment of the present disclosure, not only the setting of the characteristic of the fishing tool can be easily and reliably changed with one operating member, but also the settings of the plurality of characteristics of the fishing tool can be changed, and downsizing and waterproofing of the entire device can be achieved.

In the fishing tool according to the embodiment of the present disclosure, when the first direction is a direction in which the setting value of the setting related to the characteristic of the fishing tool increases, the control part receives the next operation of the operating part and changes the setting value of the setting in the increase direction, and when the second direction is a direction in which the setting value of the setting related to the characteristic of the fishing tool decreases, the control part receives the next operation of the operating part and changes the setting value of the setting in the decrease direction. In this way, not only the setting of the characteristic of the fishing tool can be easily and reliably changed with one operating member, but also the settings of the plurality of characteristics of the fishing tool can be changed, and downsizing and waterproofing of the entire device can be achieved.

In the fishing tool according to the embodiment of the present disclosure, the characteristic of the fishing tool is any one of a braking force of a cast brake, a drag force of a drag device, output of a notification part to the user, and a winding force of a winding device.

In the fishing tool according to the embodiment of the present disclosure, when the previous change in the setting related to the characteristic of the fishing tool is a change in the setting in the first direction or a change in the setting in the second direction, and the setting value of the setting reaches an upper limit or a lower limit, the control part receives the next operation of the operating part and changes the setting in a direction opposite to the first direction or a direction opposite to the second direction. In this way, not only the setting of the characteristic of the fishing tool can be easily and reliably changed with one operating member, but also the settings of the plurality of characteristics of the fishing tool can be changed, and downsizing and waterproofing of the entire device can be achieved.

In addition to the fishing tool according to the embodiment of the present disclosure described above, another (additional) embodiment of the present disclosure will be described. A fishing tool according to another embodiment of the present disclosure will be described using a fishing reel as an example. In the fishing reel, the setting movement direction described above may be changed according to a state of the fishing reel. As a state change detection part (means) of the fishing reel that detects a change in the state of the fishing reel, a clutch state detection part (means) may be included. A means to be detected is provided in a part of a member that moves in conjunction with a clutch operation, and it is possible to determine whether a clutch is connected or disconnected by the detection means provided in the reel body. As the detection part (means), various known detection means such as a limit switch, a magnetic sensor, and a photosensor can be used, and it is preferable to use a means to be detected according to the detection means.

Figure 6:
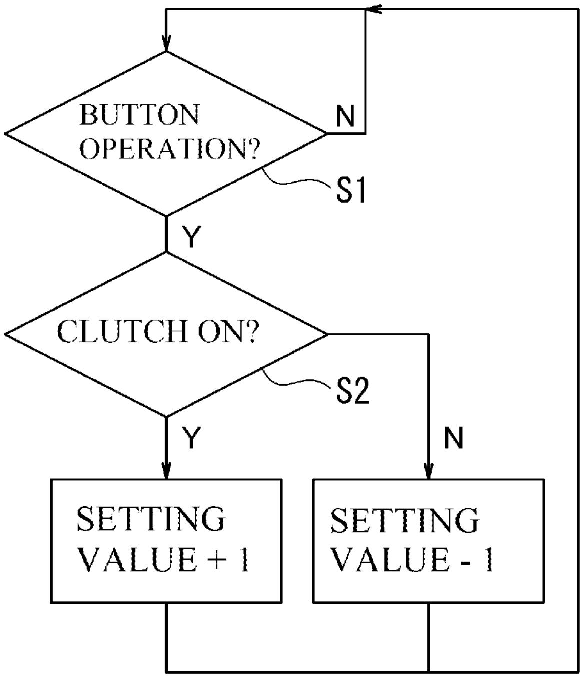
FIG. 6 is a diagram illustrating determination of a setting movement direction in a fishing reel which is a fishing tool according to another embodiment of the present disclosure.

In the fishing tool according to another additional embodiment of the present disclosure, the setting movement direction may be determined or the setting movement direction may be reversed depending on the connection state of the clutch. As illustrated in FIG. 6, first, it is determined whether the button operation is performed (step S1), and when the button operation is performed, it is determined whether the clutch is connected (step S2). When the clutch is connected, the setting value is changed to the plus direction, that is, the direction in which the setting value is increased, and when the clutch is disconnected, the setting value is changed to the minus direction, that is, the direction in which the setting value is decreased. As a result, the user can change the setting with a smaller number of operations.

In addition, in a case where the setting is increased when the clutch is connected, the setting may be reversed in the decrease direction when the clutch is disconnected, and in a case where the setting is decreased when the clutch is connected, the setting may be reversed in the increase direction when the clutch is disconnected. As a result, the user can change the setting with a smaller number of operations.

Note that the state change of the fishing reel for reversing the setting movement direction described above is not limited to the clutch connection state described above. For example, the posture (direction, translational movement, and rotational movement with respect to a gravity direction) of the reel may be detected by a motion sensor, and the setting movement direction may be reversed according to a detection amount. In addition, translational movement accelerations in three axial directions may be detected, and the setting movement direction may be reversed when the fishing reel faces a specific direction.

In addition, a spool rotation detection means may be provided to reverse the movement direction according to a spool rotation detection result. For example, the setting movement direction may be determined according to the latest spool rotational direction, and the same effects as those in the above embodiment can be realized by a method in which the setting movement direction is set to the increase direction when the latest spool movement direction is a fishing line releasing direction, and the setting movement direction is set to the decrease direction when the latest spool movement direction is a fishing line winding direction. However, the present disclosure is not limited to the clutch detection means, the motion sensor, and the spool rotation detection means, and the setting movement direction can be reversed according to detection results of various known tackle state change detection parts (means).

In the fishing tool according to another (additional) embodiment of the present disclosure, an initialization means for the setting movement direction described above may be provided. For example, a cast (throwing) end detection part (means) is provided, and the setting movement direction can be initialized when the end of the cast (throwing) is detected. Although the fishing tool (fishing reel) records the previous setting movement direction, when the setting movement direction is not matched with the user's memory, a sense of discomfort is given at the time of operation. Immediately after the user starts the setting change, it is easy to match the user's memory with the setting movement direction in the fishing tool.

When the user confirms the setting, it may frequently continue to use the setting as it is for a while. For example, in a case where the setting is changed again after 30 minutes, when the user forgets the setting movement direction, a sense of discomfort is given to the user. In order to prevent this, the setting movement direction is initialized to the decrease direction after the cast (throwing) ends. As a result, when the user memorizes that the setting movement direction always moves to the decrease direction when the setting change is started, it is difficult to give a sense of discomfort to the user.

Note that the timing of initializing the setting movement direction is not limited to the cast (throwing) end detection. Various triggers such as cast (throwing) preparation detection, elapse of a predetermined time, and power supply can be used. In addition, by making different notification sounds when the setting (value) increases and when the setting (value) decreases, or by changing a display method on a display part (means) such as an LED, it is possible to make it easier for the user to recognize the current setting movement direction and to make it difficult to give a sense of discomfort to the user.

In addition, in the fishing tool according to another (additional) embodiment of the present disclosure, a different setting change may be assigned depending on a length of time for which the operating button is pressed. That is, when the operating button is pressed for a predetermined time or more, a long pressing operation is assigned, and when the operating button is pressed for a long time, the setting value is initialized to the setting 8. As a result, it is possible to reduce the number of operations until a desired setting value is selected. In addition, when the operating button is pressed for a predetermined time or more, a long pressing operation may be assigned, and when the operating button is pressed for a long time, a setting value of another characteristic of the fishing tool may be changed. In addition, another operation other than the setting value change, such as power on/off, may be assigned to the long pressing operation. As a result, since a plurality of operation changes can be performed by one operating button and it is possible to reduce the number of operating buttons of the entire device, it is possible to realize downsizing, cost reduction, improvement of waterproof performance, and the like of the entire device.

According to each of the embodiments described above, in the fishing tool capable of selecting a plurality of options, even with one operating button, it is often possible to select a predetermined setting with a smaller number of operations as compared with the conventional selection method. As a result, since the number of operating buttons can be reduced, downsizing and improvement of waterproof performance of the entire reel can be realized. More specifically, conventionally, the braking force of the spool is set by a setting change method using a dial. In this case, in the setting of the braking force of the spool, the user rotates the dial and visually checks a numerical value displayed on the dial to change the setting. As compared with such a conventional method, in each embodiment of the present disclosure, since the operating part is configured as an operating button, it is not necessary to provide a display part and a holding part (a portion to be held by user's fingers) as compared with the dial, and the entire reel can be downsized. Furthermore, in the present disclosure, since the operating part is configured as the operating button and it is not necessary to perform the left and right rotation operations as compared with the dial, a gap between the operating button and the side plate can be easily waterproofed and dust-proofed only by covering an upper portion of the operating button with a cover member for waterproofing, and the cost can be reduced while the waterproof performance and the dust-proof performance are improved. In the present disclosure, it is possible to perform the change in the setting of the characteristic by the long pressing by changing the pressing time of the operating button as described above. That is, in the present disclosure, various operations can be performed with one operating button, and settings of various characteristics can be changed.

In the above example, the braking force of the casting brake is used as the characteristic of the fishing tool, but the present disclosure is not limited thereto.

As the characteristics of the fishing tool, characteristic adjustment of a notification means to the user such as drag force setting of a drag device in the fishing tool, light amount adjustment of a light emitting means such as an LED, volume adjustment of a buzzer, and output adjustment of a pager motor, winding speed change of an electric reel, and the like may be used. It can be used for applications in which one is selected from a plurality of options, and in particular, it may be used for applications in which the options are analog quantities and changing from a maximum value to a minimum value is small. In addition, since another candidate may be passed before a desired option is selected, a real-time setting change may be unnecessary. In addition, since it is easy to reduce the number of operating buttons, the present disclosure can be particularly applied to a device in which there is a strong demand for miniaturization, cost reduction, improvement of waterproofing performance, and the like of the entire device.

The fishing tool according to the embodiment of the present disclosure comprises a state change detection part that detects a state change of the fishing reel. In a case where the state change detection part detects the state change of the fishing reel, the control part receives the next operation of the operating part, and performs a change in a direction opposite to the first direction when the previous change in the setting is a change in the first direction and performs a change in a direction opposite to the second direction when the previous change in the setting is a change in the second direction.

In the fishing tool according to the embodiment of the present disclosure, the state change detection part is a clutch detection part or a motion sensor.

The fishing tool according to the embodiment of the present disclosure comprises a setting change direction initialization part. When initialization is detected by the setting change direction initialization part, the control part receives the next operation of the operating part and does not perform a change in the setting value of the setting based on the previous change of the setting related to the characteristic of the fishing tool.

In the fishing tool according to the embodiment of the present disclosure, the setting change direction initialization part detects at least one of a cast end, a cast preparation start, or a system start.

In the fishing tool according to the embodiment of the present disclosure, in in a case where the characteristic of the fishing tool is a braking force of a cast brake, when the initialization is detected by the setting change direction initialization part, the control part receives the next operation of the operating part and changes the setting value in a direction in which the braking force decreases.

In the fishing tool according to the embodiment of the present disclosure, the operating part is a push button. In the fishing tool according to the embodiment of the present disclosure, when the operating part is a push button, a change in setting of a different characteristic of the fishing tool is performed by long pressing of the push button.

The fishing tool according to the embodiment of the present disclosure comprises a notification part to the user. A notification method to the user is changed according to a change direction of the setting value of the setting.

Dimensions, materials, and arrangements of the components described in this specification are not limited to those explicitly described in the embodiments, and the components may be modified to have any dimensions, materials, and arrangements that may fall within the scope of the present disclosure. Further, components not explicitly described herein can be added to the described embodiments, or some of the components described in each embodiment can be omitted.

REFERENCE SIGNS LIST

1 operating part (operating button)
2 side plate
10 fishing reel
11 spool
12 clutch
14 operating part (handle)
15 braking part (spool braking part)
16 spool braking force control part (control part)
17 calculation part
18 storage part
19 detection part (sensor)
51 eddy current generation plate
52 stationary magnet
53 rotating magnet
55 gear train
56 magnet position sensor

What is claimed is:

1. A fishing tool comprising:

one operating part that is operable by a user to change a setting related to a characteristic of the fishing tool; and a control part that controls the characteristic of the fishing tool, the control part being capable of receiving an operation by the one operating part and changing the setting related to the characteristic of the fishing tool, wherein the change in the setting related to the characteristic of the fishing tool is performed using a plurality of setting values for the setting, and based on whether a previous change in the setting related to the characteristic of the fishing tool is a change in the setting in a first direction or a change in the setting in a second direction, the control part receives a next operation of the one operating part and changes a setting value of the setting.

2. The fishing tool according to claim 1, wherein the first direction is a direction in which the setting value of the setting related to the characteristic of the fishing tool increases, and the second direction is a direction in which the setting value of the setting related to the characteristic of the fishing tool decreases.

3. The fishing tool according to claim 1, wherein when the first direction is a direction in which the setting value of the setting related to the characteristic of the fishing tool increases, the control part receives the next operation of the one operating part and changes the setting value of the setting in the increase direction, and when the second direction is a direction in which the setting value of the setting related to the characteristic of the fishing tool decreases, the control part receives the next operation of the one operating part and changes the setting value of the setting in the decrease direction.

4. The fishing tool according to claim 1, wherein the characteristic of the fishing tool is any one of a braking force of a cast brake, a drag force of a drag device, output of a notification part to the user, and a winding force of a winding device.

5. The fishing tool according to claim 1, wherein the control part is further configured such that (i) when the previous change in the setting related to the characteristic of the fishing tool is a change in the setting in the first direction or a change in the setting in the second direction, (ii) the setting value of the setting reaches an upper limit or a lower limit, and the next operation of the one operating part is received by the control part, the control part changes the setting in a direction opposite to the first direction or a direction opposite to the second direction.

6. The fishing tool according to claim 1, further comprising:

a state change detection part that detects a state change of the fishing tool, wherein in a case where the state change detection part detects the state change of the fishing reel, the control part receives the next operation of the one operating part, and performs a change in a direction opposite to the first direction when the previous change in the setting is a change in the first direction and performs a change in a direction opposite to the second direction when the previous change in the setting is a change in the second direction.

7. The fishing tool according to claim 6, wherein the state change detection part is a clutch detection part or a motion sensor.

8. The fishing tool according to claim 1, further comprising:

a setting change direction initialization part, wherein when initialization is detected by the setting change direction initialization part, the control part receives the next operation of the one operating part and does not perform a change in the setting value of the setting based on the previous change of the setting related to the characteristic of the fishing tool.

9. The fishing tool according to claim 8, wherein the setting change direction initialization part detects at least one of a cast end, a cast preparation start, or a system start.

10. The fishing tool according to claim 8, wherein in a case where the characteristic of the fishing tool is a braking force of a cast brake, when the initialization is detected by the setting change direction initialization part, the control part receives the next operation of the one operating part and changes the setting value in a direction in which the braking force decreases.

11. The fishing tool according to claim 1, wherein the one operating part is a push button.

12. The fishing tool according to claim 1, wherein when the one operating part is a push button, a change in setting of a different characteristic of the fishing tool is performed by long pressing of the push button.

13. The fishing tool according to claim 1, further comprising:

a notification part to the user, wherein a notification method to the user is changed according to a change direction of the setting value of the setting.

14. The fishing tool according to claim 1, wherein each operation of the one operating part is a same operation regardless of whether the control part changes the setting value in the first direction or the second direction.

15. The fishing tool according to claim 1, wherein the one operating part is a single-action button.

16. The fishing tool according to claim 1, further comprising a state change detection part that detects a state change of the fishing tool, wherein the control part determines a setting movement direction based on both the operation of the one operating part and a detection result of the state change detection part.

17. The fishing tool according to claim 16, wherein the state change detection part is a clutch detection part that detects whether a clutch of the fishing tool is in a connected state or a disconnected state as the detection result.

* * * * *